Figure 1:
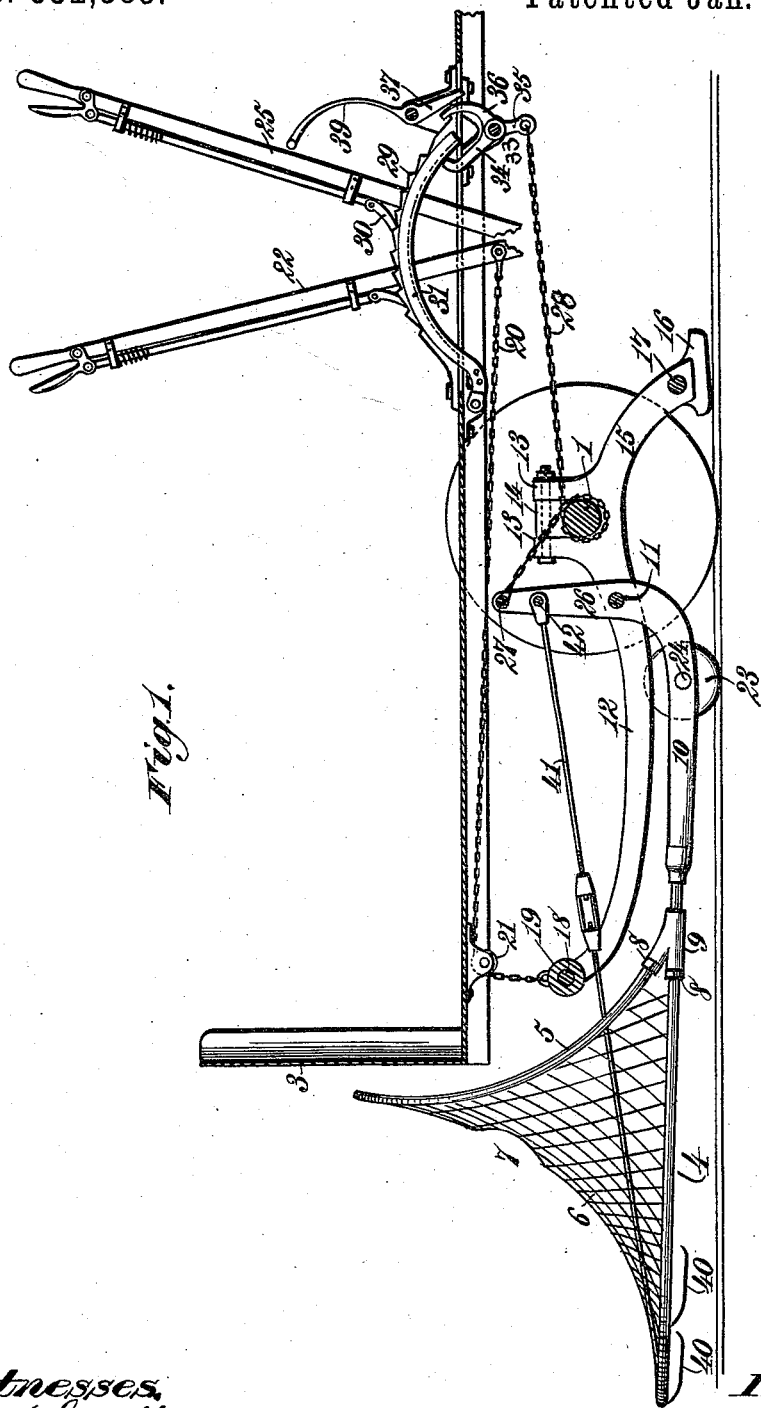

(No Model.) 3 Sheets—Sheet 1.

J. T. MATTHEWS.
FENDER AND BRAKE FOR RAILWAY CARS.

No. 532,385. Patented Jan. 8, 1895.

Witnesses:
Robert Emmett
Thos. A. Green

Inventor:
John T. Matthews.
By James L. Norris.
Atty.

THE NORRIS PETERS CO., PHOTO-LITHO., WASHINGTON, D. C.

(No Model.)  
3 Sheets—Sheet 2.
J. T. MATTHEWS.
FENDER AND BRAKE FOR RAILWAY CARS.
No. 532,385. Patented Jan. 8, 1895.
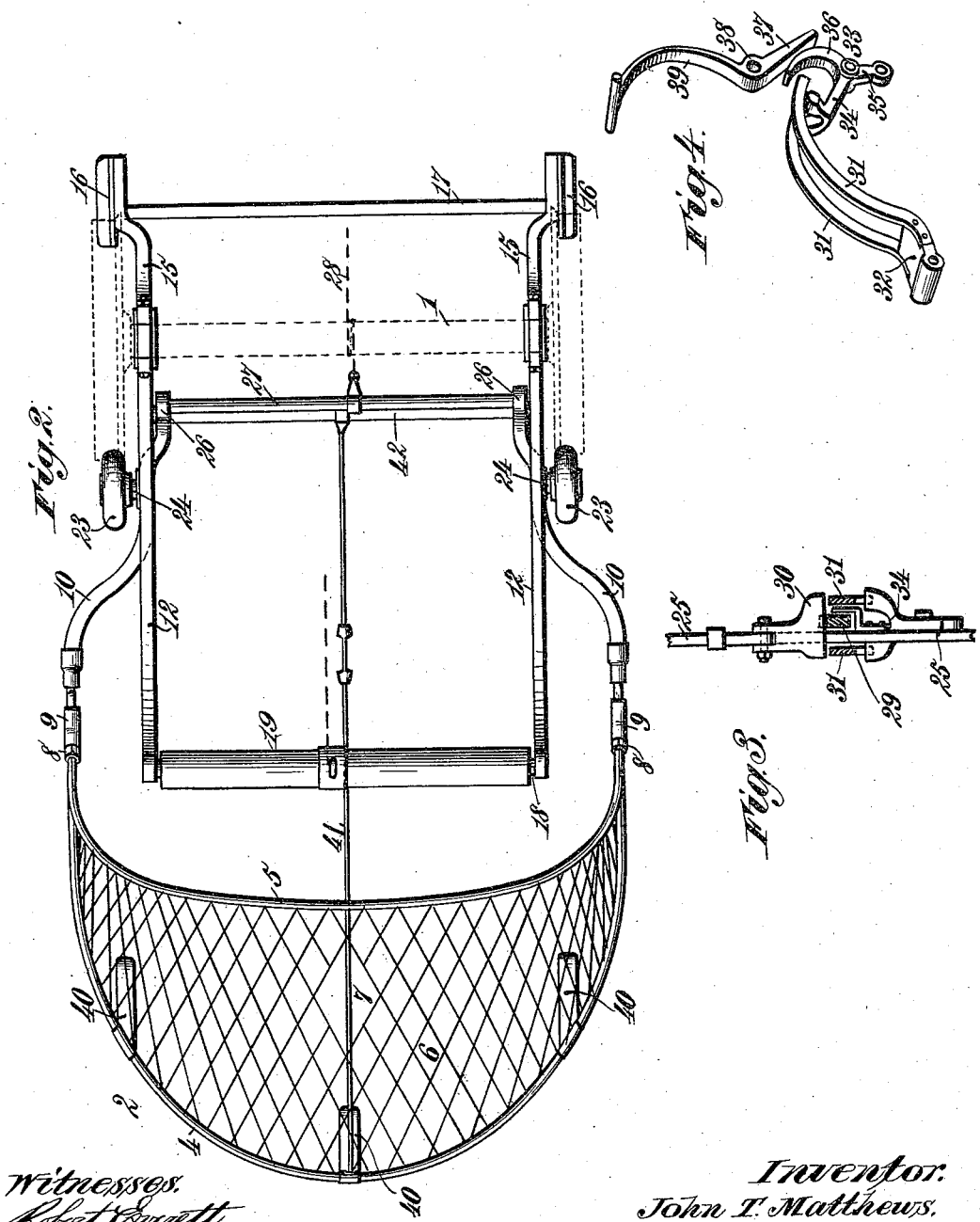
Witnesses.
Robert Currett
Thos. A. Green
Inventor:
John T. Matthews.
By James L. Norris.
Atty.

(No Model.) 3 Sheets—Sheet 3.
J. T. MATTHEWS.
FENDER AND BRAKE FOR RAILWAY CARS.
No. 532,385. Patented Jan. 8, 1895.
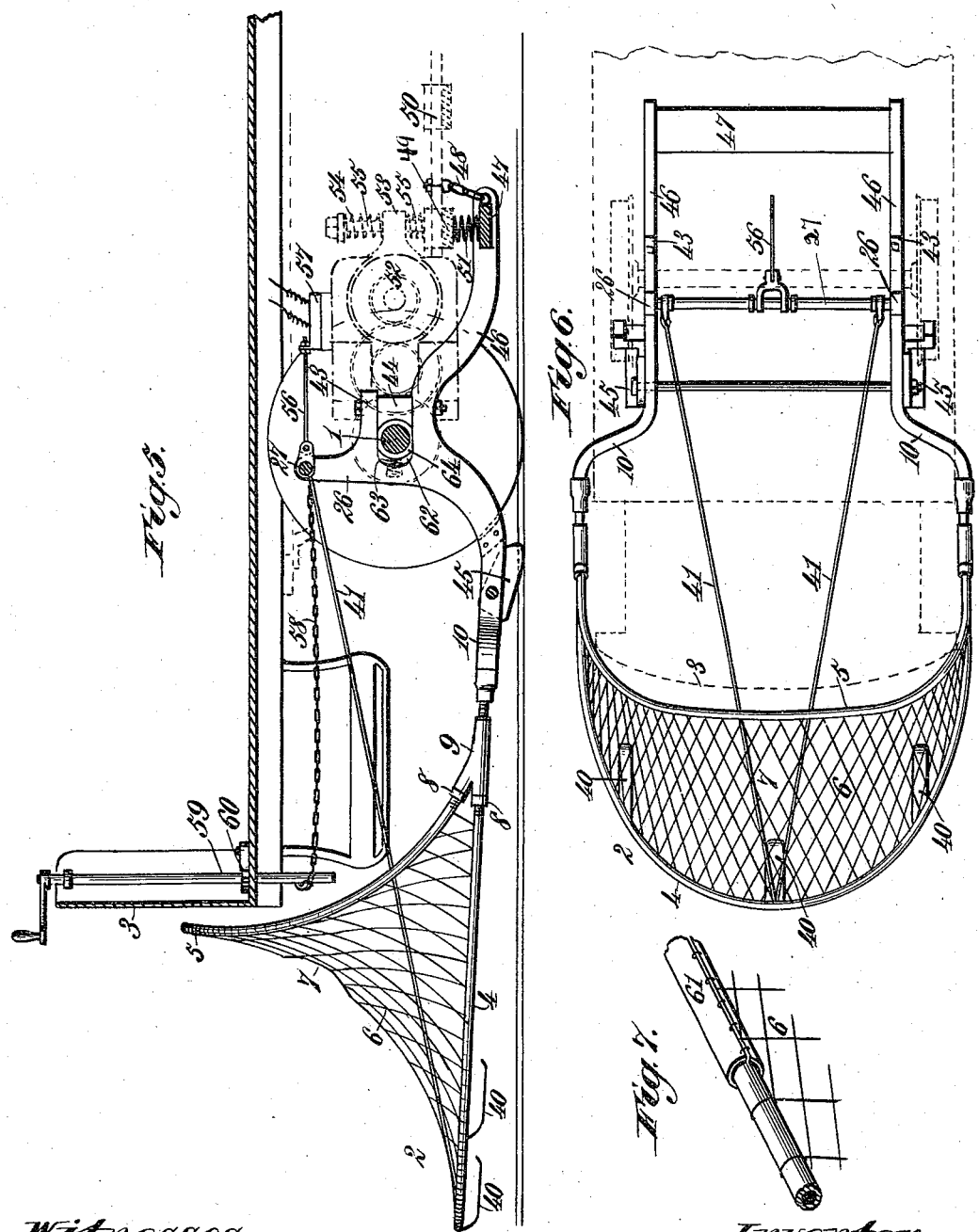
Witnesses.
Robert Everett
Thos. A. Green
Inventor.
John T. Matthews.
By James L. Norris.
Atty.

UNITED STATES PATENT OFFICE.

JOHN T. MATTHEWS, OF BALTIMORE, MARYLAND, ASSIGNOR OF TWO-THIRDS TO WILLIAM H. WHITING AND MARK WELLS, OF SAME PLACE.

FENDER AND BRAKE FOR RAILWAY-CARS.

SPECIFICATION forming part of Letters Patent No. 532,385, dated January 8, 1895.

Application filed March 7, 1894. Serial No. 502,743. (No model.)

*To all whom it may concern:*

Be it known that I, JOHN T. MATTHEWS, a citizen of the United States, residing at the city of Baltimore, in the State of Maryland, have invented new and useful Improvements in Fenders and Brakes for Railway-Cars, of which the following is a specification.

This invention relates to life protecting fenders or guards for street cars, railway rolling stock or coaches and other vehicles propelled by cables or by electric or other motors.

Among the objects of my invention are to provide an automatic safety guard or fender combined with a track brake and preferably, supported therewith from a car truck axle; to so construct the fender and arrange it in such proximity to the track that while avoiding slight obstructions or irregularities of surface it will not pass over the limbs or body of a person in collision but will serve to sustain such person and prevent contact with the wheels or any part of the car; and, further, to so arrange the fender and its connections that the weight of a person caught in the fender and depressing its forward end will automatically apply the track brake or brakes and disconnect or shut off the propelling power of the car or other vehicle. The act of the motor-man in applying the track brake will also depress the fender close to the roadway so that a person struck before the car has come to a full stop will be caught up onto or in the fender without being subjected to injury.

To these various ends and as a means for gaining other advantages in the protection of life and limb on railways, my invention consists in the features of construction and novel combinations of parts in car fenders or guards as hereinafter more particularly described and claimed.

In the annexed drawings, illustrating the invention—Figure 1 is a partly sectional side elevation showing my improved fender and its connections attached to the grip-car of a cable railroad. Fig. 2 is a plan of the same. Figs. 3 and 4 are detail views of devices operated from the fender to automatically release the grip lever and throw it into position to unclutch the grip from the power driven cable when a person or animal is caught in the fender, while the increased weight, in depressing the fender, automatically actuates the track brakes. Fig. 5 is a partly sectional elevation of the fender and track brake attached to the truck-axle of an electric-motor car with connections actuated from the fender for automatically cutting off the electromotive current when a person or animal is caught in the fender, the track brakes being at the same time automatically applied, and showing other connections to a crank shaft controlled by the motor-man and through which the fender and track brakes are depressed and the motor current cut off at will. Fig. 6 is a plan of the fender and its means of connection with an electric motor. Fig. 7 is a detail view of means for insulating the frame of a fender attached to an electric car.

Referring to the drawings, the numeral 1 designates a car truck axle and 2 a flexible guard or fender supported from said axle and projecting in advance of the car. The fender is extended upward in front of the dash 3 and also laterally to such distance as will prevent a person, or animal, in collision from coming in forcible contact with any part of the car or being rolled under the same before it can be stopped.

A preferable construction of the flexible guard or fender comprises a horizontally arranged bow-shaped frame 4 that is carried a suitable distance beyond the end of the car and near the ground, a forwardly and upwardly curved bow-shaped frame 5 placed nearer the car and extended across in front of the dash, and a netting 6 securely attached to the diverging frames 4 and 5 and composed of stout, strongly knotted cords arranged with sufficient slack to form a somewhat concaved receptacle for sustaining a person falling or caught up therein. Where a grip car or other motor car is intended to be run in either direction, without turning, and is provided at each end with a fender of this character, an opening 7 may be provided in the netting 6 for passage of the coupling devices that are required to connect with a trailer. The bow shaped frames 4 and 5 of the fender should be of light but durable construction and are preferably made from metal tubing. The ends of these frames converge at opposite sides of the car and are secured in and supported by sockets 8 formed in V shaped couplings 9 fastened to the forward ends of oscillatory arms 10 through which the guard or fender is supported.

In Figs. 1 and 2, representing the preferred arrangement or application of my fender in connection with a grip-car, I have shown the oscillatory arms 10 connected by pivots 11 to forward projecting arms 12 that are pivotally supported on the truck axle. The pivots 11 of the oscillatory arms 10 may be formed by the ends of a cross-bar or rod that will also serve as a brace for said arms. The arms 12, Fig. 1, are provided with spaced apart ears 13 forming a recess to engage the truck axle, and the pivotal connection of each arm with the axle is completed by a wear block 14 placed between the projecting ends of said ears and secured in place by a bolt. In this form of construction each arm 12 is provided with a rearwardly and downwardly curved extension or brake arm 15 carrying a shoe or track brake 16 at its lower end. A cross-bar 17 may be arranged to connect and brace these brake arms. The forward ends of the arms 12 are curved upward and connected by a cross rod 18 that may be weighted, by surrounding it with a sleeve 19 of lead or other heavy material, to normally lift the brake shoes 16 away from the tracks or roadway.

To the cross-rod 18, or its weighted sleeve 19, is attached the forward end of a cable or chain 20 that is passed up over a guide pulley 21 on the under side of the car and then rearward to the track brake lever 22, the rear or inner end of the chain being secured to said lever at a convenient point above its fulcrum. It will now be seen that on throwing the track brake lever 22 in the proper direction to draw on the chain 21 the arms 12 will be lifted and their rearward extensions or brake arms 15 will be swung downward so as to force the attached brake shoes 16 in contact with the tracks.

When the oscillatory arms 10 are pivotally supported by the arms 12 which are in turn pivotally supported from the axle of the car wheels, as shown in Figs. 1 and 2, the said arms 10 should be provided with small truck wheels 23 arranged to run on the railway tracks. The journal or axle 24 of each truck wheel 23 serves as a fulcrum for the arm 10 connected therewith. Now when the track brake lever 22 is thrown in the proper direction to draw on the chain 21 and lift the arms 12 the innermost or rear ends of the arms 10 will be also lifted, the said arms 10 will fulcrum on the axles 24 of the small truck wheels 23 and the forward or outer ends of the arms 10 will be oscillated downward and thereby carry the guard or fender 2 more closely toward the track or roadway and into such position that a person struck by the fender will fall or be caught into it and thus protected from serious injury. Before operating the track brake lever 22 to lower the fender and apply the track brakes, the grip-man should, of course, throw the grip lever 25 into proper position to release the grip from the moving cable. The track brake lever 22 and grip lever 25 are of ordinary character and provided with the usual well known rack and pawl locking and releasing mechanism. It will be observed that on disconnecting the car from its motive power and applying the track brakes, the safety guard or fender will be instantly lowered or brought into position for most effective operation should a person be struck before the car comes to a stop.

Through inattention of the grip-man, or otherwise, it may sometimes happen that a person will be struck by the fender while the car is moving at speed. It is one of the principal purposes of my invention to provide means whereby the weight of a person caught on the fender will automatically actuate devices for releasing the grip lever, throw it into position for unclutching the grip and at the same time apply the brakes. For this purpose the oscillatory arms 10 are provided with upward extensions 26 connected by a cross-bar 27 for attachment of a chain 28 through which will be operated a suitable mechanism for automatically releasing the grip lever and throwing off the grip.

On opposite sides of the segmental rack 29, Figs. 1 and 3, for engaging the pawl 30 of the grip lever, are placed arc shaped lifting bars 31 each of which may, at one end, be formed on or rigidly secured to a common pivotal block 32, Fig. 4, so that both bars will always lift together. These lifting bars 31 are arranged beneath and in position to act on the under side of the laterally extended pawl 30, as shown in Fig. 3. A three armed lever 33, Figs. 1 and 4. is pivotally supported below and adjacent to the free ends of the two arc shaped lifting bars 31 and has one of its arms 34 made with a bifurcated end for contact with the under sides of said lifting bars. To a depending arm 35 of the lever 33 is secured one end of the chain 28, the other end of which connects with the safety guard or fender. The chain 28 is preferably of such length as to be wound loosely, one or more times, around the axle 1 as shown in Figs. 1 and 2. That portion of the chain 28 in contact with the axle is normally slack, as shown in Fig. 1, and while it so remains the chain is not affected by the revolution of the axle; but when the fender is depressed, as by the weight of a person caught thereon, the consequent forward swinging movement of the cross-bar 27 will draw the chain 28 taut and in close contact with the axle which, in its forward rotation, will now impart a jerk to the rear portion of said chain and to the attached arm 35 that will cause the arm 34 to be rocked suddenly upward and made to strike against the under sides of the lifting bars 31 with such force as will disengage and lift the pawl 30 from the rack 29 of the grip lever.

Another arm 36 of the lever 33, is arranged in bearing contact with the lower arm 37 of a pivotally supported two-armed lever 38 having an upward extended spring arm 39 arranged to bear against the grip lever 25 in such position as to throw said lever, when released, in the proper direction to unclutch the grip from the cable. The upper end of the spring lever arm 39 should be somewhat extended in lateral directions, as shown in Fig. 4, so that it will always have a reliable bearing contact with the grip lever notwithstanding any lateral vibrations. By making the lever arm 39 of spring metal so that it will be yielding and elastic its efficiency will be increased and liability of breakage will be avoided when the lever arm is forced backward in throwing the grip lever to its extreme position for tightening the grip onto the cable. In the operation of this mechanism for automatically releasing the grip-lever and throwing off the grip, the weight of a person in collision will depress the fender, draw the chain 28 taut so that by rotation of the axle it will be jerked forward and cause the three armed lever 33 to forcibly lift the bars 31, release the pawl 30 from the rack 29 and simultaneously actuate the two-armed lever 38 to force the released grip lever into position for fully opening or unclutching the grip from the moving cable. At the same time, as the forward end of the fender is depressed, the arms 10 will rock on the axles of the small wheels 23 and the arm extensions 26 will thus receive a forward and upward movement that, besides drawing on the chain 28, will lift the arms 12 and depress their extensions 15 so as to force down the track brakes 16 into contact with the tracks.

The under side of the safety guard or fender is preferably provided with yielding runners 40 secured to the lower bow-shaped frame 4 in position to protect it from injury by forcible contact with the track or roadway when the fender is depressed. For the purpose of bracing the fender it may be advisable to extend one or more guys 41 from the forward portion of the bow shaped frame 4 to one of the cross-bars 27 or 42 connecting the upward extended arms 26 of the oscillatory fender supports.

By reference to Figs. 2 and 6 it will be observed that the fender supporting arms 10 are curved forward and outward in such manner that the portion of the fender immediately adjacent to the car will present sufficient breadth and extent of surface to protect a person from forcible contact with the car body or dash. Where the end of the car is provided with steps, as in Figs. 5 and 6, the supports of the fender may pass below the projecting portions of the steps, and the sides of the upward extended bow frame 5 will occupy such positions in advance of the steps as to prevent a person from being struck by them. The manner of supporting the fender from an axle of the car truck, so that it will swing with the truck in turning curves, obviously affords more protection, and in the direction most required on curves, than would be given by attaching a fender to the car body or dash.

In Figs. 5 and 6 I have shown a modified arrangement of the fender supporting devices, or their connections with the truck axle, whereby the safety guard or fender is more especially adapted for application to a car propelled by an electric motor. As shown in these figures, the arms 12 and 15 are dispensed with, and the arms 10 and 26 are pivoted directly on the axle 1 of the car truck. On the arms 10 and 26 may now be formed spaced apart ears 43 to receive the truck axle, the pivotal connection between said arms and axle being completed by means of a wear block 44 bolted between the outer ends of each pair of ears.

Track brakes 45, Figs. 5 and 6, are carried by the oscillatory arms 10 and are preferably pivoted thereto at one end and in such position that the other end of each brake will rest lightly on the track and serve as a guide for the fender in turning curves while the whole lower surface of each brake will be forced down into hard frictional contact with the railway tracks when the safety guard or fender is depressed. The arms 10 are provided with rearward extensions 46 connected by a cross-bar 47 that may be of sufficient weight to counterbalance the fender and track brakes and hold them normally away from the surface of the road. A chain 48 is provided to sustain this bar.

Above the bar 47 is located a cross-bar 49 of the truck frame 50 and between these bars may be placed a spirally coiled spring 51, one or more, to exert sufficient pressure on the bar 47 to hold the fender in its normal slightly raised position.

An electric motor 52, of any suitable character is geared with the truck axle 1 and supported by the car truck frame. To steady the motor it may be provided with a perforated projection or lug 53 for engagement with a vertical stud or spindle 54 having thereon, above and below the lug 53 spirally coiled springs 55 that bear at their opposite ends against said lug and the truck frame.

To the cross bar 27 of the pivotal arm extensions 26 is connected one end of a rod 56 the other end of which has an adjustable connection with a sliding switch block 57 through which the electric motor is controlled. The cross-bar 27 is also connected by a chain 58 with a vertical crank shaft 59 such as is ordinarily mounted at the end of an electric car and which may be provided with pawl and ratchet locking devices 60, as usual.

By means of the crank shaft 59 the motor, the track brakes and the safety guard or fender are under immediate control of the motor-man, so that by revolving said shaft in the proper direction to wind the chain 58 and draw the arm extensions 26 forward the switch slide 57 will be moved into position to break the electric circuit or cut out the motor, the track brakes 45 will be forced wholly down onto the tracks and the safety guard or fender 2 will be carried close to the tracks to receive any one who may have fallen or been knocked down. If a person should be struck before his presence on the track is discovered by the motor-man the fender will be depressed and the arms 10 will be automatically oscillated downward and forward so as to shift the switch 57, cut off the power and apply the track brakes.

When the fender is used on an electric car it is preferable to provide each of the frames 4 and 5 with an insulating covering 61, Fig. 7, of any suitable material that is made to surround said frames and may be secured thereon by any convenient means.

It will be obvious that with but slight modification in the arrangement of connecting devices the fender herein described can be attached to a grip-car, an electric car or other motor propelled car either by means of the intermediate supporting devices shown in Figs. 1 and 2 or those shown in Figs. 5 and 6. For instance, if it be desired to employ the fender supporting mechanism shown in Fig. 1 on an electric car, it will only be necessary to substitute for the chain 28, Fig. 1, a rod 56, Fig. 5 connecting with the switch of an electric motor, and then shorten the chain 20 and carry it in rear of and over the pulley 21, Fig. 1, to a crank shaft mounted on the front of the car. On the other hand, should it be desired to use the fender supporting mechanism shown in Fig. 5 on a grip-car, it will only be necessary to replace the switch rod 56 with a chain 28 extended from the fender to the automatic actuating mechanism of a grip lever, as already described with reference to Fig. 1, and connect the track brake lever with the fender by means of a chain, as 20, Fig. 1, extended from said lever to a pulley located in advance of the cross-bar 27 and thence backward to said cross-bar. The operation of the fender, the power disconnecting device and the track brakes would be the same, in either case, as already described, whether automatically or at the will of the grip-man or motor-man. The manner of connecting the fender supporting devices with the truck axle is such that, in either form of construction, the fender can be readily placed in operative position on cars now in use, and can be easily detached when no longer required.

As a further advantage of my invention it may be stated that by forcing the forward ends of the oscillatory arms 10 downward so as to fulcrum on the small truck wheels 23, Fig. 1, or on the track brakes 45, Fig. 5, as the case may be, one end of the car may be lifted sufficiently to facilitate its return to the track when derailed. This action of the arms 10 may be effected either through the track brake lever 22 or the crank shaft 59, and especially if a long hand lever is attached to the latter through which it may be conveniently operated from the ground.

The small truck wheels 23, Fig. 1, and the pivoted track brakes 45, Fig. 5, are each adapted to serve the useful purpose of guiding the fender in turning curves, as at street corners, so that the fender will afford greater protection by having a tendency to turn or swing around a little in advance of the forward end of the car.

In order that the fender may more readily and quickly respond to the guiding of the wheels 23 or pivoted track brakes 45, as the case may be, it is preferable to provide the fender supporting frame or arms with an easy or yielding pivotal connection to the car axle. This may be accomplished, as shown in Fig. 5, by forwardly elongating the slots 62 in the fender supporting arms that engage the axle and placing springs 63 in the forward ends of said slots so as to bear at their rear ends against a sleeve 64 surrounding the axle. The sleeve 64 is loose on the axle 1 and does not rotate therewith, its upper and lower surfaces being flattened to fit between the ears 43 by which it is held from rotation and thus affords a firm bearing for the rear ends of the springs. By this manner of connecting the fender supporting frame or arms with the car axle the fender can easily swing laterally, or to either side in response to the guiding action of the pivoted track brakes 45 while the springs 63, besides holding the frame in its normally forward position, will serve as buffers to render the fender yielding and elastic and thereby diminish the risk of injury to any one struck by it.

What I claim as my invention is—

1. A car fender composed of a horizontally arranged bow-shaped frame, a forwardly and upwardly curved bow-shaped frame diverging from the inner portion of the horizontally arranged frame and extended upward and across in front of the dash, and a netting attached to and supported by said frames, substantially as described.

2. A car fender supported wholly from a car truck axle and composed of two bow shaped frames diverging in horizontal and vertical directions, respectively, and a netting secured to and supported by said frames to form a concaved receptacle, substantially as described.

3. A car fender pivotally supported from a car truck axle and composed of a horizontally arranged bow-shaped frame having its under side provided with yielding runners, a forwardly and upwardly curved bow shaped frame diverging from the inner end of the horizontal bow-shaped frame, and a netting supported by said frames, substantially as described.

4. An automatic car fender or safety guard extended in front of a car and having its supporting frame provided with automatic track-brakes and pivotally mounted on a car truck axle, substantially as described.

5. An automatic car fender or safety guard pivotally supported from a car truck axle and composed of horizontally and vertically diverging bow shaped frames and a netting attached to and supported by said frames, in combination with track brakes carried with and automatically actuated from said fender, substantially as described.

6. An automatic and counterbalanced car fender or safety guard pivotally supported from a car truck axle and in close proximity to the track, in combination with track brakes automatically actuated from said fender, substantially as described.

7. The combination with a car or vehicle, of oscillatory arms pivotally supported on a truck axle, a car fender or safety guard supported by said arms and extended in advance of the car, devices connected with the fender for automatically cutting off the power when the fender is in collision, and track brakes carried with and automatically actuated from said fender, substantially as described.

8. The combination with a car or vehicle, of an automatic car fender or safety-guard pivotally supported from a truck axle and extended in advance of the car, devices connected with the fender and automatically actuated therefrom for cutting off the power when the fender is in collision, and mechanism for simultaneously controlling the power devices and the fender at will, substantially as described.

9. The combination with a car or vehicle, of an automatic car fender or safety guard pivotally supported from a truck-axle, devices connected with the fender and adapted to be automatically actuated therefrom for cutting off the power when the fender is in collision, track brakes carried with and adapted to be automatically actuated from the fender, and mechanism for simultaneously controlling the fender, the power and the track brakes at will, substantially as described.

10. The combination with a grip-car, of an automatic pivotally supported car fender or safety guard, lifting bars pivotally supported at the sides of the segmental grip-lever rack in position to lift and disengage the pawl of said grip-lever, a three-armed lever adapted to be automatically actuated from the car fender to operate said lifting bars, and a two armed lever adapted to be actuated by the said three-armed lever to throw the released grip lever in position for actuating the grip, substantially as described.

11. The combination with a grip car, of an automatic car fender or safety guard pivotally supported from a truck-axle and extended in advance of the car, devices connected with the fender and adapted to be automatically actuated therefrom to release the grip lever when the fender is depressed by the weight of a person, or object caught thereon, track brakes carried with and adapted to be automatically actuated from the fender, and a track brake lever for actuating the fender and track brakes at will, substantially as described.

12. The combination with a car, of oscillatory arms pivotally supported from a truck axle, an automatic fender or safety guard supported by said arms and extended in advance of the car in position to be depressed by the weight of a person or object caught thereon, track brakes carried with and automatically actuated from the fender, and mechanism connected with the fender for automatically cutting off the power when the fender is in collision, substantially as described.

13. The combination with a car, of oscillatory arms pivotally supported from a truck axle and having a forwardly and laterally yielding connection with said axle, a safety guard or fender supported by said arms and extended in advance of the car, guiding devices connected with said oscillatory fender supporting arms and adapted to engage with the track rails, and mechanism connected with the fender for automatically cutting off the power and applying the brakes when the fender is depressed by the weight of a person or object in collision, substantially as described.

14. The combination with a car or vehicle, of an automatic safety guard or fender pivotally supported from a truck axle and adapted to be depressed by the weight of a person or object in collision, brakes carried with and adapted to be automatically actuated from said fender, and mechanism connected with the fender for automatically cutting off the power and applying the brakes when the fender is depressed by the weight of a person or object caught thereon, substantially as described.

In testimony whereof I have hereunto set my hand in presence of two subscribing witnesses.

JOHN T. MATTHEWS.

Witnesses:
 THOS. A. GREEN,
 G. W. REA.